United States Patent

Minami et al.

Patent Number: 5,187,418
Date of Patent: Feb. 16, 1993

[54] METHOD OF CONTROLLING ARTICULATED ROBOT

[75] Inventors: Yoshikatsu Minami; Masato Tanaka, both of Kitakyushu, Japan

[73] Assignee: Kabushiki Kaisha Yaskawa Denki Seisakusho, Kitakyushu, Japan

[21] Appl. No.: 761,952

[22] PCT Filed: Jan. 21, 1991

[86] PCT No.: PCT/JP91/00063
§ 371 Date: Sep. 23, 1991
§ 102(e) Date: Sep. 23, 1991

[87] PCT Pub. No.: WO91/10945
PCT Pub. Date: Jul. 25, 1991

[30] Foreign Application Priority Data

Jan. 23, 1990 [JP] Japan ................. 2-011890

[51] Int. Cl.⁵ ............... G05B 19/18; G05B 19/415; B25J 9/10
[52] U.S. Cl. ................. 318/568.19; 318/567; 901/3; 901/15; 395/86
[58] Field of Search ............ 318/560–575; 364/474.01–474.33; 395/88–99; 901/3, 5, 8, 9, 12, 15, 17–23, 48, 45

[56] References Cited

U.S. PATENT DOCUMENTS

| | | | |
|---|---|---|---|
| 4,408,286 | 10/1983 | Kikuchi et al. | 318/568 X |
| 4,488,242 | 12/1984 | Tabata et al. | 318/561 X |
| 4,529,921 | 7/1985 | Moribe | 318/567 X |
| 4,550,383 | 10/1985 | Sugimoto | 318/573 X |
| 4,594,670 | 6/1986 | Itoh | 318/632 X |
| 4,604,716 | 8/1986 | Kato et al. | 318/568 |
| 4,665,352 | 5/1987 | Bartelt et al. | 318/568 |
| 4,680,519 | 7/1987 | Chand et al. | 318/568 |
| 4,705,451 | 11/1987 | Mori et al. | 901/8 X |
| 4,710,884 | 12/1987 | Tokairin et al. | 901/48 X |
| 4,712,183 | 12/1987 | Shiroshita et al. | 901/3 X |
| 4,823,279 | 4/1989 | Perzley et al. | 395/86 |
| 4,894,788 | 1/1990 | Stelzer | 318/568.19 |
| 4,967,126 | 10/1990 | Gretz et al. | 318/568.19 |
| 4,970,370 | 11/1990 | Hara | 901/42 X |
| 5,065,337 | 11/1991 | Hara | 901/15 X |

FOREIGN PATENT DOCUMENTS

| | | |
|---|---|---|
| 62193786 | 8/1925 | Japan . |
| 59-218513 | 12/1984 | Japan . |
| 63-30905 | 2/1988 | Japan . |
| 63-118804 | 5/1988 | Japan . |
| 6416389 | 1/1989 | Japan . |
| 6442704 | 2/1989 | Japan . |

*Primary Examiner*—Paul Ip
*Attorney, Agent, or Firm*—Oblon, Spivak, McClelland, Maier & Neustadt

[57] ABSTRACT

A method of controlling an articulated robot having in excess of six axes and up to twelve axes, comprises the steps of dividing the axes into two groups each composed of six axes or less, those axes which are positioned on one side of a dividing point (P) closely to a reference point serving as redundancy axes (11), those axes which are positioned on the other side of the dividing point closely to a robot wrist (Q) serving as basic axes (12), and controlling the dividing point (P), as a first control point, by way of interpolation and controlling the robot (Q), as a second control point, by way of interpolation with the controlled first control point regarded as a new reference point, so that all the axes of the articulated robot can be controlled by way of interpolation.

2 Claims, 2 Drawing Sheets

METHOD OF CONTROLLING ARTICULATED ROBOT

TECHNICAL FIELD

The present invention relates to a method of controlling an articulated robot having redundancy.

BACKGROUND ART

Recently, industrial robots are required to make more flexible movement to copy with more complex jobs, and tend to have an increased number of control axes that can be controlled simultaneously. Generally, the necessary and sufficient conditions that a robot has to meet in order to reach a desired wrist position and a desired wrist posture are that the robot have six axes. However, recent applications demand for industrial robots having redundancy which have in excess of six axes.

In order for a robot wrist to make interpolated motion, the position and posture of the robot wrist on a certain path have to be controlled by the rotational angles of the respective articulations of the robot. However, since the robots having redundancy which have in excess of six axes require an enormous amount of calculations, it is difficult to process data on a real-time basis during robot operation, and such robots have not been put to practical use.

As one solution to the above problems, there has heretofore been proposed a control method for determining the rotational angle of a fourth axis so that the sum of or the difference between the cosine of the rotational angle of a second axis and the cosine of the rotational angle of a sixth axis will take an extreme value in a seven-axis robot, as disclosed in Japanese Patent Laid-Open No. 64-42704 (or No. 42704/89). Japanese Patent Laid-Open No. 64-16389 (or No. 16389/89) discloses a method of controlling the position and posture of a robot wrist through the reconstruction of a virtual six-axis robot with redundancy axes fixed.

The conventional control methods are, however, limited to a seven-axis robot or require a robot to be controlled as a virtual six-axis robot. As the redundancy axes are temporarily stopped, not all axes are controlled simultaneously, and the robot is not controlled for flexible movement.

DISCLOSURE OF THE INVENTION

In view of the aforesaid drawbacks, it is an object of the present invention to provide a method of controlling an articulated robot so that all axes of the robot can be controlled simultaneously.

According to the present invention, a method of controlling an articulated robot having in excess of six axes and up to twelve axes, comprises the steps of dividing the axes into two groups each composed of six axes or less, those axes which are positioned on one side of a dividing point closely to a reference point serving as redundancy axes, those axes which are positioned on the other side of the dividing point closely to a robot wrist as basic axes and controlling the dividing point, as a first control point, by way of interpolation, and controlling the robot wrist, as a second control point, by way of interpolation with the controlled first control point regarded as a new reference point.

The axes ranging from the reference point to the first control point comprise six axes or less, and the axes ranging from the first control point to the second control point also comprise six axes or less. The first control point is controlled by way of interpolation, and the second control point is controlled by way of interpolation with reference to the first control point that has been controlled by way of interpolation, each interpolation is controlled according to the conventional control method.

BEST MODE FOR CARRYING OUT THE INVENTION

Figure 1:
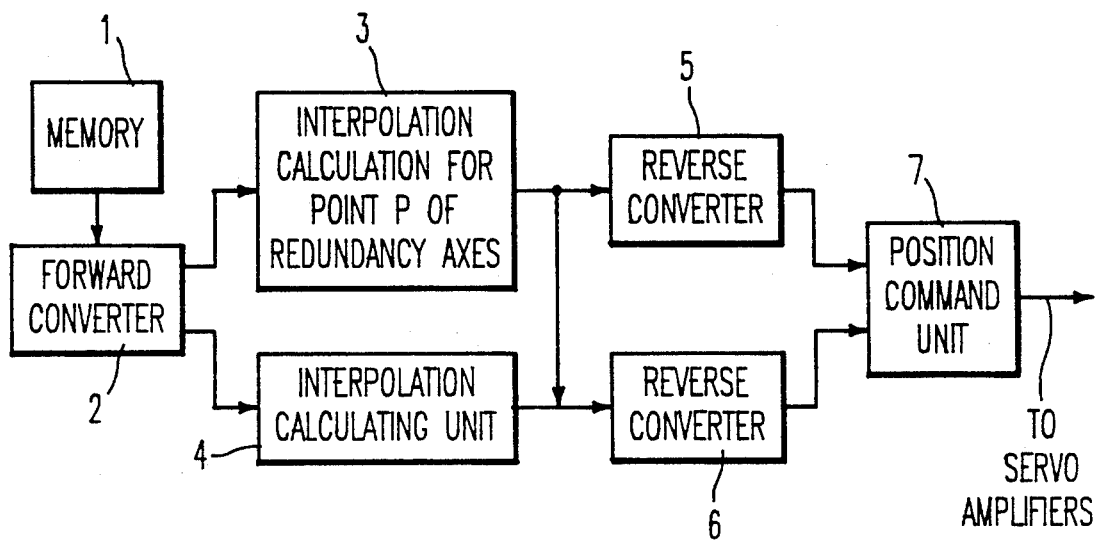
FIG. 1 is a block diagram showing an apparatus to carry out a method of controlling an articulated robot according to the present invention.
Figure 2:
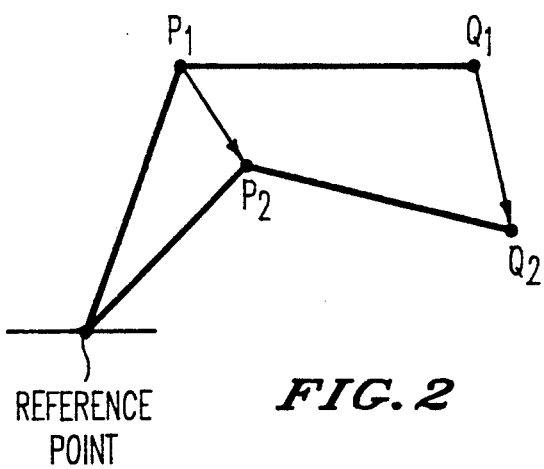
FIG. 2 is a diagram showing first and second control points.
Figure 3:
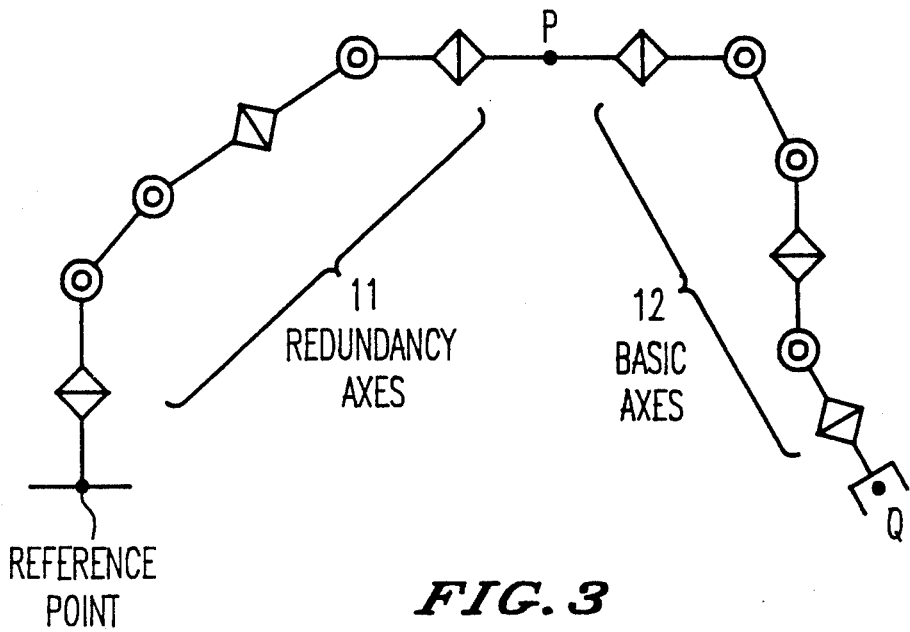
FIG. 3 is a diagram showing FIG. 2 in detail.

According to the present invention, it is assumed that, as shown in FIGS. 2 and 3, a total of twelve axes are divided into two groups each composed of six axes, and a control point P as a first control point for redundancy axes 11 and a control point Q as a second control point (robot wrist) for basic axes 12 are indicated by $P_1$, $Q_1$ and $P_2$, $Q_2$ in the respective groups. The control point Q at the robot wrist is controlled to make linearly interpolated motion. Now, the method according to the present invention will be described below with reference to FIG. 1.

Pulse data for the respective axes of the robot, which indicate the second control points $Q_1$, $Q_2$ are taken from a memory 1, and forwardly converted by a forward converter 2, thus calculating position and posture data for the control points $P_1$, $Q_1$, $P_2$, $Q_2$. These calculations will not be described as it is known that they can be effected if the axis arrangement of the robot and the rotational angles of the respective axes are given. The known technology is described in detail in ROBOT MANIPULATORS Mathematics, Programming, and Control by Richard P. Paul, the MIT Press (translated book: ROBOT MANIPULATORS, published by Corona Co.).

Figure 4:
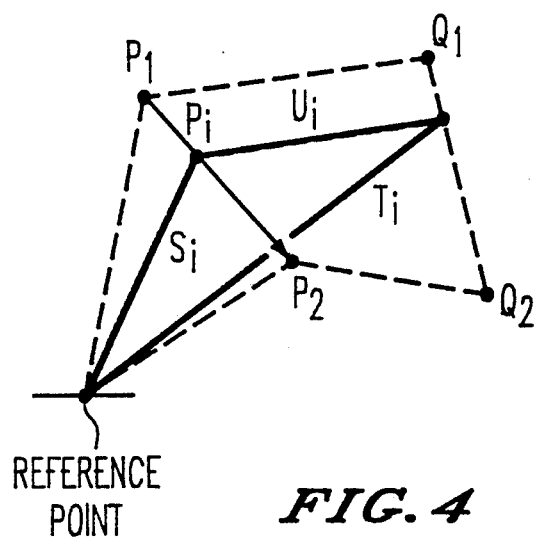
FIG. 4 is a diagram showing the control method according to the invention.

With respect to the control point Q at the robot wrist, calculations for linear interpolation from $Q_1$ to $Q_2$ are effected by an interpolation calculating unit 4. At this time, a matrix that represents the position and posture of an ith control point Qi with respect to a dividing number n is indicated by Ti (i=1, ..., n), as shown in FIG. 4. Furthermore, calculations for the control point P for the redundancy axes to make interpolated motion from $P_1$ to $P_2$ are effected by an interpolation calculating unit 3. This interpolated motion is not limited to linearly interpolated motion, but may be joint motion, linearly interpolated motion, or circularly interpolated motion depending on the application in which the robot is used. A matrix that represents the position and posture of an ith control point Pi with respect to the dividing number n is indicated by Si (i=1, ..., n). When the matrix Si is inputted to a reverse converter 5 which calculates rotational angles $\theta_1 \sim \theta_6$ of the redundancy axes. These calculations may be carried out according to the method disclosed in Japanese Patent Laid-open No. 62-193786 (or No. 193786/87).

Rotational angles $\theta_7 \sim \theta_{12}$ of the basic axes are calculated by inputting Ui, which is produced by the following matrix calculations, to the reverse converter 6:

$$Ti = Si \cdot Ui$$

$$Ui = Si^{-1} \cdot Ti \ (i = 1, \ldots, n).$$

These calculations may also be carried out according to the method disclosed in the above Laid-Open publication.

The calculated rotational angles $\theta_1 \sim \theta_{12}$ are then supplied to a position command unit 7, whose output signals are applied to servoamplifiers for the respective axes for controlling all the axes of the articulated robot.

With the present invention, as described above, the axes of the articulated robot are divided into groups composed of six axes or less, and the first and second control points are established, with the second control point being controlled with reference to the first control point. Therefore, the control method is not limited to a seven-axis robot, or is not required to control the robot as a virtual six-axis robot with the redundancy axes temporarily stopped. Accordingly, the control method makes it possible to control the robot to make various interpolated motions for flexible robot movement while controlling the twelve axes simultaneously.

We claim:

1. A method of controlling an articulated robot having more than six axes and up to twelve axes, comprising the steps of:

dividing the axes of the robot into a first group comprising six axes or less positioned on one side of a first control point on said robot which is a side of said robot where a reference point of said robot is positioned, and a second group comprising six axes or less positioned on the other side of said first control point which is a side of said robot where a robot wrist is positioned, said robot wrist defining a second control-point on said robot, said first group of axes serving as redundancy axes and said second group of axes serving as basic axes;

controlling the first control point of said robot based on said reference point by performing an interpolation calculation to provide for an interpolated motion of said first control point; and controlling the second control point of said robot to control the robot wrist by performing a further interpolation calculation based on said first control point which serves as a further reference point to provide for an interpolated motion of said second control point.

2. The method of claim 1, comprising the further steps of:

calculating rotational angles of the axes of said robot; and simultaneously controlling the movement of said axes based on the calculated rotational angles.

* * * * *